United States Patent [19]
King et al.

[11] Patent Number: 5,644,333
[45] Date of Patent: Jul. 1, 1997

[54] COLOR KEY DETECTION SCHEME FOR MULTIMEDIA SYSTEMS

[75] Inventors: Sherman T. King, San Francisco; Tommy C. Lee, Danville; Niantsu Wang, Milpitas; Scott A. Kimura, San Jose; Guorjuh T. Hwang, Milpitas, all of Calif.

[73] Assignee: AuraVision Corporation, Fremont, Calif.

[21] Appl. No.: 354,190

[22] Filed: Dec. 12, 1994

[51] Int. Cl.$^6$ ............................................. G09G 5/00
[52] U.S. Cl. .................... 345/115; 345/114; 345/113; 345/200
[58] Field of Search ........................ 345/200, 113, 345/114, 115; 348/591, 592; 341/118

[56] References Cited

U.S. PATENT DOCUMENTS

| | | | |
|---|---|---|---|
| 4,823,120 | 4/1989 | Thompson et al. | 345/199 |
| 5,065,231 | 11/1991 | Greaves et al. | 345/113 |
| 5,122,784 | 6/1992 | Canova | 345/114 |
| 5,220,312 | 6/1993 | Lumelsky et al. | 345/200 |
| 5,463,422 | 10/1995 | Simpson et al. | 348/390 |

*Primary Examiner*—Richard Hjerpe
*Assistant Examiner*—Vui T. Tran
*Attorney, Agent, or Firm*—Skjerven, Morrill, MacPherson, Franklin & Friel; Brian D. Ogonowsky

[57] ABSTRACT

This method is most advantageous when an analog multiplexer is controlled to pass either analog graphics signals or analog motion video signals to a multimedia display screen. In the preferred embodiment, this method includes the steps of outputting a digital color key from a graphics memory buffer at a designated time and for a designated period and then converting this color key to an analog signal. This analog color key signal is then detected during this designated period and stored to obtain a stored color key value. The graphics memory is then controlled to output the graphics signals to be displayed on a multimedia screen. These graphics signals include a digital color key for controlling a multiplexer to display a motion video window on the multimedia screen in place of the color key. The outputted graphics signals are converted into analog signals, and these analog signals are compared to the stored color key value for detecting whether a color key is being outputted in the graphics data stream. When the analog graphics signal matches the stored color key value, the multiplexer is controlled to pass motion video signals to the multimedia screen for displaying a video window within a graphics display. By using this method, the detection of a color key is not affected by any drifts in the analog graphics signal.

6 Claims, 11 Drawing Sheets

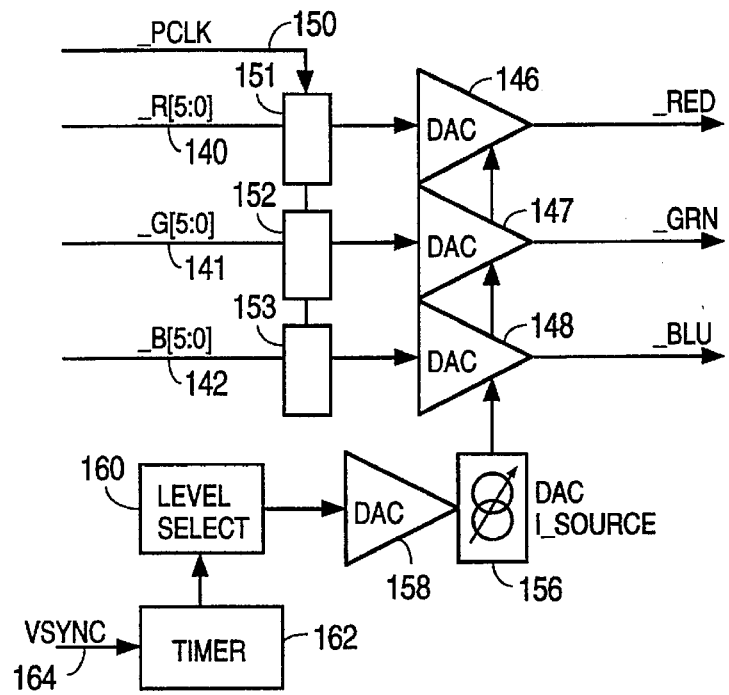
FIG. 5A
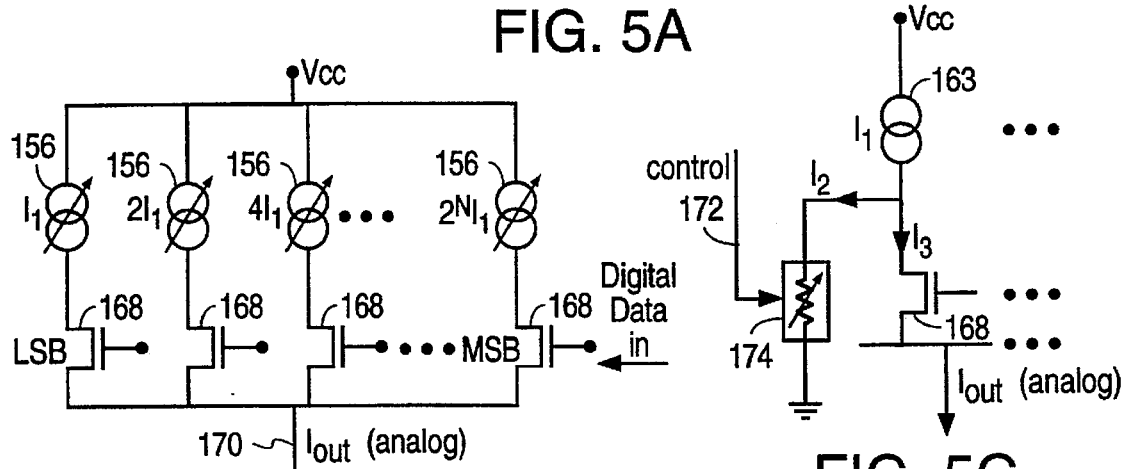
FIG. 5B
FIG. 5C
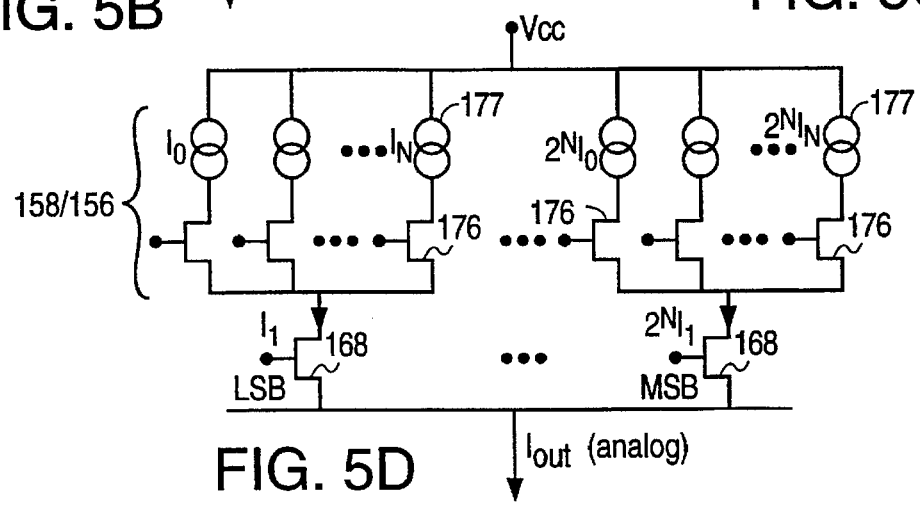
FIG. 5D

WRITE TIMING DIAGRAM

READ TIMING DIAGRAM

COLOR KEY DETECTION SCHEME FOR MULTIMEDIA SYSTEMS

CROSS-REFERENCE TO RELATED APPLICATIONS

This application is related to U.S. application Ser. No. 08/127,219, filed Sep. 27, 1993, entitled "Flexible Multiport Multiformat Burst Buffer," and related to U.S. application Ser. No. 08/136,621, filed Oct. 13, 1993, entitled "Data Processing Technique for Limiting the Bandwidth of Data to be Stored in a Buffer," and related to U.S. application Ser. No. 08/142,623, filed Oct. 22, 1993, entitled "Video Processing Technique Using Multi-Buffer Video Memory," all three applications being assigned to the present assignee and incorporated herein by reference.

FIELD OF THE INVENTION

This invention relates to multimedia systems and, in particular, to an improved technique for merging graphics and video signals for display on a monitor.

BACKGROUND OF THE INVENTION

In a typical multimedia computer system, a conventional personal computer is augmented with a full-motion video card to display full-motion video images in a window on its display screen. The video information may be generated by any source. Still images, such as text, may be concurrently displayed outside the video window. Such a system offers enormous potential for educational applications and other interactive applications.

FIG. 1 illustrates a conventional multimedia circuit within a personal computer. The original full-motion video data may be in the form of a standard analog video signal such as in a National Television System Committee (NTSC) format or other format. Assuming the original video data is analog, this analog signal is then converted to a digital signal using an A/D converter 10. This digitized signal is then applied to an input of a full-motion video card 12 (which may or may not include the A/D converter 10). Such a video card 12 includes a full-motion video memory buffer 14.

The video card 12 is connected to a system bus 16. Also connected to bus 16 is a conventional VGA controller and frame buffer card 20. The VGA card outputs digital RGB graphics data (including clock data) to the video card 12 via a feature connector 21. The digital full-motion video data contained in the video memory buffer 14 is multiplexed with the digital graphics data. This multiplexed digital data is then converted to RGB analog signals and applied to a monitor via cables 23. The monitor then displays a full-motion video window along with graphics data outside the window.

If the video card 12 were not installed, the VGA card 20 would be connected to drive the monitor by RGB analog signals directly outputted on leads 25. A conventional D/A converter in VGA card 20 converts the digital output of the VGA frame buffer to analog RGB signals on leads 25.

The personal computer's CPU 22 is connected to the system RAM 24, and the CPU 22 is connected to bus 16 for controlling, among other things, the operation of the video card 12 and VGA card 20.

FIG. 2 illustrates in more detail the video card 12 and its interaction with the VGA card 20 and monitor 30. Repeated elements from FIG. 1 are identified with identical numerals. The display monitor 30 may display on the order of 800×600 pixels or more. The frame buffer in the VGA card 20 and the video memory buffer 14 contain storage locations which are typically bit-mapped to the display screen so that the storage locations have a one-to-one correspondence with the pixels in the display monitor 30. Therefore, proper timing of the video and graphics signals is critical to obtain the desired display of video and graphics data.

An input port 32 on the motion video card 12 receives analog or digital motion video information from a VCR, laser disk, CD ROM, television, or any other video source. This information is then converted into the proper digital format and applied to a vertical and horizontal scaler 34. The vertical and horizontal scaler 34 is controlled by signals on a control line to reduce (if desired) the pixel size (width× height) of the incoming video image so that the motion video image can be displayed in a small window 36 on the display monitor 30. The original video image (e.g., 640×480 pixels) may be scaled down by dropping lines of pixels to reduce the vertical height and by dropping pixels along a horizontal line to reduce the horizontal width of the video image. Such scaling also reduces the required size of the motion video memory buffer 14 and its peak bandwidth demands.

This scaled video data is then buffered by a first-in/first-out (FIFO) buffer 37. FIFO buffer 37 is also used to synchronize the video data with the memory buffer 14 clock. The data outputted by FIFO buffer 37 is then stored in the memory buffer 14, which may be a VRAM or DRAM, in a bit-mapped arrangement.

The digital data from the VGA card 20 and the digital full-motion video data from the memory buffer 14 are then multiplexed by a digital multiplexer 38, which is controlled to pass the full-motion video data to the display monitor 30 at the proper time.

A horizontal and vertical expander may be used at the output of the memory buffer 14 to increase the pixel size of the video image. Additionally, a FIFO buffer may be inserted between the memory buffer 14 and the multiplexer 38.

The resulting multiplexed data stream outputted from multiplexer 38 is converted to RGB analog signals by the D/A converter 40 and then applied to the display monitor 30 to display a full-motion video window 36 along with graphics data. If we assume that the incoming video pixel size was scaled down by half in each dimension, to 320×240 pixels, a full-motion video window 36 of 320×240 pixels will be displayed by the display monitor 30.

At appropriate times during the raster scanning of the display screen, the multiplexer 38 is controlled by a signal on control line 44 to output either the digital graphics data or the video data to the display monitor 30 for display. The multiplexer 38 should be timely controlled so that the full-motion video image is aligned within the rectangular window 36 on the display screen. The position and size of the window 36 is chosen by the user with the aid of a mouse or keyboard. The Window™ program by Microsoft provides such a multimedia feature. The application program may, instead, automatically select the size and position of the window 36. The program typically automatically controls the scaler 34 and memory controller for the video memory buffer 14 so that the size and location of the video data stored in buffer 14 corresponds with the position and size of window 36.

The control of multiplexer 38 to properly position video window 36 on the display screen is typically accomplished as follows.

Using the Windows™ program, the size and location of the full-motion video window 36 may be programmed by the user using a selected color key. The digital RGB signals corresponding to the selected color key are then stored in the VGA frame buffer (in VGA card 20) as a rectangular block which is bit-mapped to the display pixels corresponding to window 36 in FIG. 2. The selected color key value is also applied to an input 45 of a digital comparator 46 along with the digital output of the VGA card 20. When the digital RGB signal outputted from the VGA card 20 matches the previously selected color key, the comparator 46 switches multiplexer 38 to pass the full-motion video data to the D/A converter 40. The timing of the video memory buffer 14 must be synchronized with the VGA frame buffer, otherwise the video data intended to be displayed within window 36 will not be aligned within the window 36.

Other methods exists to control the overlay of a motion video window 36 on a display screen. However, using a color key is one of the simplest and most popular methods.

It is also known to control multiplexer 38 by detecting when a chroma key value outputted by video memory buffer 14 matches a pre-selected chroma key value. When this chroma key value is detected in the video stream, multiplexer 38 is then controlled to pass the graphics data from the VGA card 20 to the D/A converter 40. This operation is called a chroma key overlay. For example, the color blue may be selected as the chroma key value so that the blue color in the original video picture will be replaced with the graphics data outputted by the VGA card 20. In the personal computer arena, however, the graphics data is usually in the background, and the video window 36 will be the overlay.

Since the personal computer graphics data is provided to the video card in a digital form, the video overlay process is conducted in the digital domain. However, in today's personal computer technology, the video overlay system and method described with respect to FIG. 2 posts several limitations.

Typically, the motion video card 12 is provided separately from the VGA card 20, and these cards are provided by a variety of manufacturers. The transmission of digital graphics data to the motion video card 12 is by means of a feature connector 21, which has a speed limitation of only about 30 MHz. Today's computer graphics displays can accept analog signals from a VGA card (via RGB leads 25 in FIG. 1) at about 135 MHz. Thus, resolution and color quality is reduced by limiting the bandwidth of the graphics data from 135 MHz to 30 MHz in order to operate the VGA card 20 in conjunction with the motion video card 12. Because of this speed limitation of the feature connector 21, most video add-on products are designed to perform only up to about 45 MHz.

Interfacing with the feature connector 21 also creates severe graphics compatibility problems. The digital graphics data to be transferred over the feature connector 21 can be in an 8-bit, 15-bit, 16-bit, or 24-bit format, depending on the color quality provided by the VGA card. The setup and hold times of the pixel clock are different due to the VGA card being manufactured by different manufacturers. In order to reduce compatibility problems due to the variable data formats and clock parameters, the motion video card 12 has to re-buffer or re-generate the clock and data signals provided by the VGA card 20. This increases the cost and complexity of the motion video card 12.

What is needed is a new system and technique for an improved video overlay system which allows the highest quality images to be displayed on a monitor with little or no increase in cost and which reduces the compatibility problems between today's VGA cards and motion video cards. This improved system should also overcome previous problems with misalignment between the video data and the intended video overlay window on a display screen.

SUMMARY

The above-described limitations on picture quality (due to the limited bandwidth of the feature connector) and the compatibility problems between VGA cards and video cards are avoided using the present invention. The present invention overcomes these problems by not using the VGA card's feature connector to interface with a video card.

In the preferred embodiment, the RGB analog signals generated by the VGA card are applied to a first input of an analog multiplexer. The digital video data stored in the video memory buffer is converted to RGB analog signals using a D/A converter, and these analog signals are applied to a second input of the analog multiplexer. An analog comparator compares a preselected color key to the analog output of the VGA card. When there is a match, the analog comparator controls the multiplexer to pass the analog video data to the monitor for display. When the color key is not detected, the data from the VGA card is transmitted to the monitor for display.

Since the RGB analog output of the VGA card and the analog video signals must be in a standard RGB format necessary for driving the monitor, there will be no compatibility problems between the VGA card and the video card. The required RGB format for a particular monitor size is well known.

A special analog comparator is used to insure that any drifts in the analog output of the VGA card (causing a drift in the color key) will not adversely affect the operation of the video overlay system. An improved D/A converter is also described for converting the digital output of the video card to an analog output compatible with the analog output of the VGA card. A self-adjusting color key detection system is also described which periodically adjusts the video card's color key detector using a feedback mechanism so that any drifts in the analog color key will not cause the color key to be outside the range of the detector.

An automatic alignment method is also described for automatically aligning the video data with respect to the intended video window, as determined by the color key output of the VGA card. This automatic alignment method generates an offset signal for the video memory buffer timing when the zero position (corresponding to pixel zero/line zero on the display screen) in the video memory buffer differs from the zero position in the VGA frame buffer. This offset is then used to adjust the zero position in the video memory buffer.

Other features for improving the video overlay precision and the quality of the displayed image are also described.

BRIEF DESCRIPTION OF THE DRAWINGS

FIG. 5A is a block diagram illustrating a preferred embodiment D/A converter for use in the system of FIG. 3.

FIGS. 5B, 5C, and 5D are schematic diagrams illustrating circuits which may be used to implement the D/A converter of FIG. 5A.

DETAILED DESCRIPTION OF THE PREFERRED EMBODIMENTS

Figure 3:
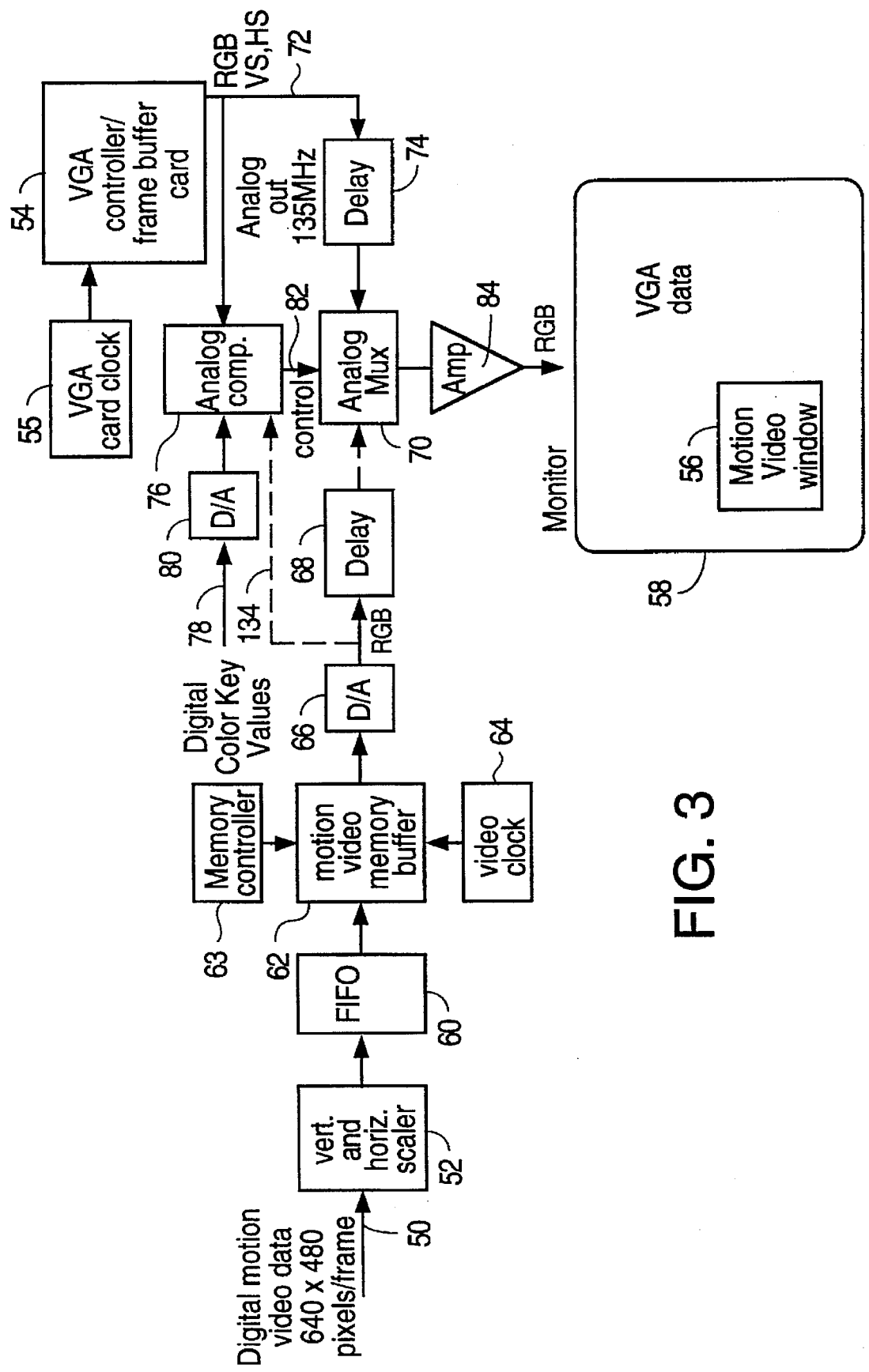
FIG. 3 is a block diagram of a full-motion video controller card in accordance with one embodiment of the invention and its connection to a VGA card and monitor.

FIG. 3 is a block diagram illustrating one embodiment of the present invention. The construction of the individual circuits in FIG. 3 which are not described herein in detail may be conventional and well understood by those skilled in the art after reading this disclosure.

Figure 1:
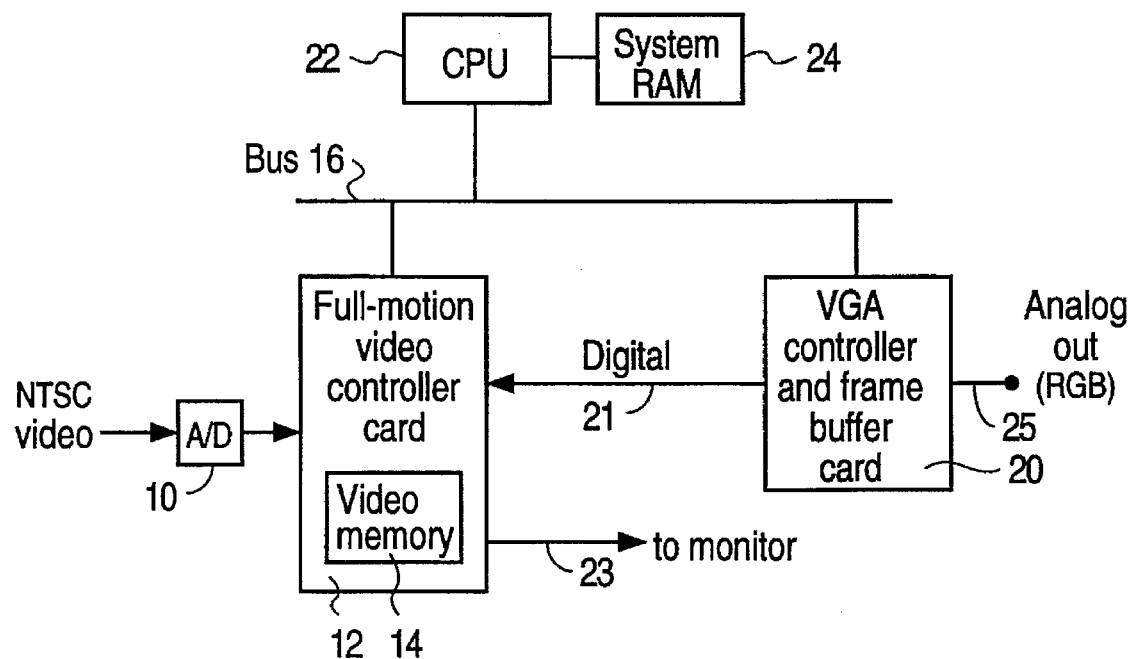
FIG. 1 is a block diagram of a conventional personal computer incorporating a full-motion video controller card to provide the personal computer with a multimedia capability.

In FIG. 3, digital motion video data, such as outputted by the A/D converter 10 in FIG. 1, is applied to the input 50 of a vertical and horizontal scaler 52. This scaler 52 is, in the preferred embodiment, formed on a motion video card along with the other circuit blocks shown in FIG. 3 except for the VGA card 54 and VGA card clock 55. The digital motion video data may contain RGB data for controlling, for example, 640×480 pixels per frame.

The vertical and horizontal scaler 52 is used to reduce the original pixel size from 640×480 to, for example, 320×240 to limit the bandwidth of the data and to provide a video pixel size corresponding to the size of the motion video window 56 to be displayed on a standard VGA monitor 58. The scaler 52 is clocked using the clock derived from the original video data.

A first-in/first-out (FIFO) buffer 60 is used to temporarily store the scaled video data to accommodate the timing differences between the scaler 52 and a motion video memory buffer 62. The buffering and synchronization function performed by FIFO buffer 60 is conventional and will not be discussed herein in detail. The patent documents previously identified provide additional detail regarding the functions of the scaler 52 and FIFO buffer 60, and their interaction with the memory buffer 62.

The data outputted from FIFO buffer 60 is applied to the input of the video memory buffer 62, which may be a DRAM or VRAM or other suitable memory. The memory buffer 62 is controlled by a memory controller 63. The memory controller 63 coordinates the input and output of data to and from video memory buffer 62 as well as the sequential addressing of video memory buffer 62 so that the video data is bit-mapped to the display screen. The function and operation of memory controllers for controlling a video memory buffer are well known. A video clock 64 controls the input and output timing of video data in accordance with the well known raster scanning requirements of monitor 58. A FIFO buffer may be inserted after the video memory buffer 62 if necessary to reduce the peak bandwidth demands on the video memory buffer 62. The FIFO buffer would then be clocked by a pixel clock outputted by video clock 64. A D/A converter 66 converts the digital RGB video signals to analog RGB signals having a format and signal parameters substantially identical to the format and signal parameters of the analog output of the VGA card 54. These standard analog signals are those necessary to drive a conventional monitor 58.

The analog output of the D/A converter 66 is then applied to a delay circuit 68, which may be any conventional analog delay circuit, to accommodate the delay in controlling analog multiplexer 70. The analog output of the delay circuit 68 is applied to an input of analog multiplexer 70.

A conventional VGA controller/frame buffer card 54 (hereinafter referred to as VGA card 54) is clocked using a local clock 55 residing on card 54. The clock 55 generates the RGB pixel clock along with the vertical and horizontal synchronization pulses necessary to control the raster scanning of monitor 58. This conventional VGA card contains a feature connector which is shown in FIG. 1 as connector 21. This feature connector 21 is used in today's multimedia systems for transmitting the digital graphics data, clock, and synchronization information to conventional motion video cards. As previously described with respect to FIG. 1, this feature connector only has a bandwidth on the order of 30 MHz. The conventional VGA card 54 also has RGB analog output leads 72 intended for use when the VGA card 54 drives a monitor directly and no motion video card is connected in the system. These analog signals are on the order of 135 MHz and provide a higher quality signal (color and resolution) than the digitized signal outputted by the feature connector 21 in FIG. 1. A conventional D/A converter in the VGA card converts the digital graphics data outputted by the VGA frame buffer to analog signals outputted on leads 25.

In the preferred embodiment system of FIG. 3, the feature connector on the conventional VGA card 54 is not used. Instead, the analog RGB output on lines 72 of the VGA card 54 is connected to a delay circuit 74, and the delayed analog RGB signal is applied to a second input of the analog multiplexer 70. The delay circuit 74 is a conventional analog delay circuit and provides sufficient delay to take into account the delay in controlling the analog multiplexer 70. The analog RGB output signals of the VGA card 54 on lines 72 are also connected to an input of an analog comparator 76.

In the preferred embodiment operation, it is assumed that the user selects a position and size of the video window 56 and selects a digital color key value for controlling the multiplexing of the video and graphics data streams. The color key value is typically eight bits. The position and size of the video window 56 and the color key may be selected using the Windows™ program in a conventional manner. The personal computer, in conjunction with the VGA circuitry, automatically stores the selected color key value in those storage locations in the VGA frame buffer corresponding to the size and position of the intended video window 56.

In one embodiment, the selected position and size information for the video window 56 may also be used by the memory controller 63 to store bit-mapped video data in those storage locations of the video memory buffer 62 corresponding to the pixels in video window 56. In the preferred embodiment, however, the timing of the video memory buffer 62 is automatically offset so that video data is outputted at precisely the right time to coincide with the occurrence of the color key outputted by the VGA card 54 on lines 72. This automatic offset will be discussed in greater detail later with respect to FIG. 8.

In one embodiment, the selected digital color key value (in an RGB format) is applied to an input 78 of D/A converter 80. D/A converter 80 converts this digital color key value to an RGB analog value and applies this value to an input of analog comparator 76. Analog comparator 76 then detects whether there is a match between the preselected color key value and an RGB color signal on the analog output lines 72 of the VGA card 54. In an alternate embodiment, a narrow color key range is provided to the analog comparator 76, and analog comparator 76 determines whether an analog color signal on lines 72 is within the preselected range. By identifying a range of color keys, slight drifts in the analog output of VGA card 54 will not affect the detection of a color key signal on lines 72.

If the analog comparator 76 then detects a match between the preselected color key value and the analog output on lines 72 or if the analog output on lines 72 is within the predetermined color key range, the analog comparator 76 controls the analog multiplexer 70, via control line 82, to pass the analog RGB video signal (outputted by delay circuit 68) to the input of monitor 58 through amplifier 84. When analog multiplexer 70 is thus controlled, the motion video picture is displayed in the video window 56 instead of the color key value outputted by VGA card 54. If there is no match between the preselected color key and the analog signal on lines 72 or if the color signal on lines 72 is not within a preselected color key range, the analog multiplexer 70 is controlled to pass the RGB analog output of delay circuit 74 to monitor 58 through amplifier 84. The delay provided by analog delay circuits 68 and 74 takes into account the delay incurred by the analog comparator 76 and analog multiplexer 70 in detecting a color key and switching between the two data sources. This delay will normally range between 0.5 to 2 pixel clock cycles.

The VGA card 54/56 and the motion video card containing the other circuitry in FIG. 3 are programmed by the personal computer housing the cards via a bus similar to bus 16 in FIG. 1. The interface between the system bus and the video card is described with respect to FIG. 12.

Figure 2:
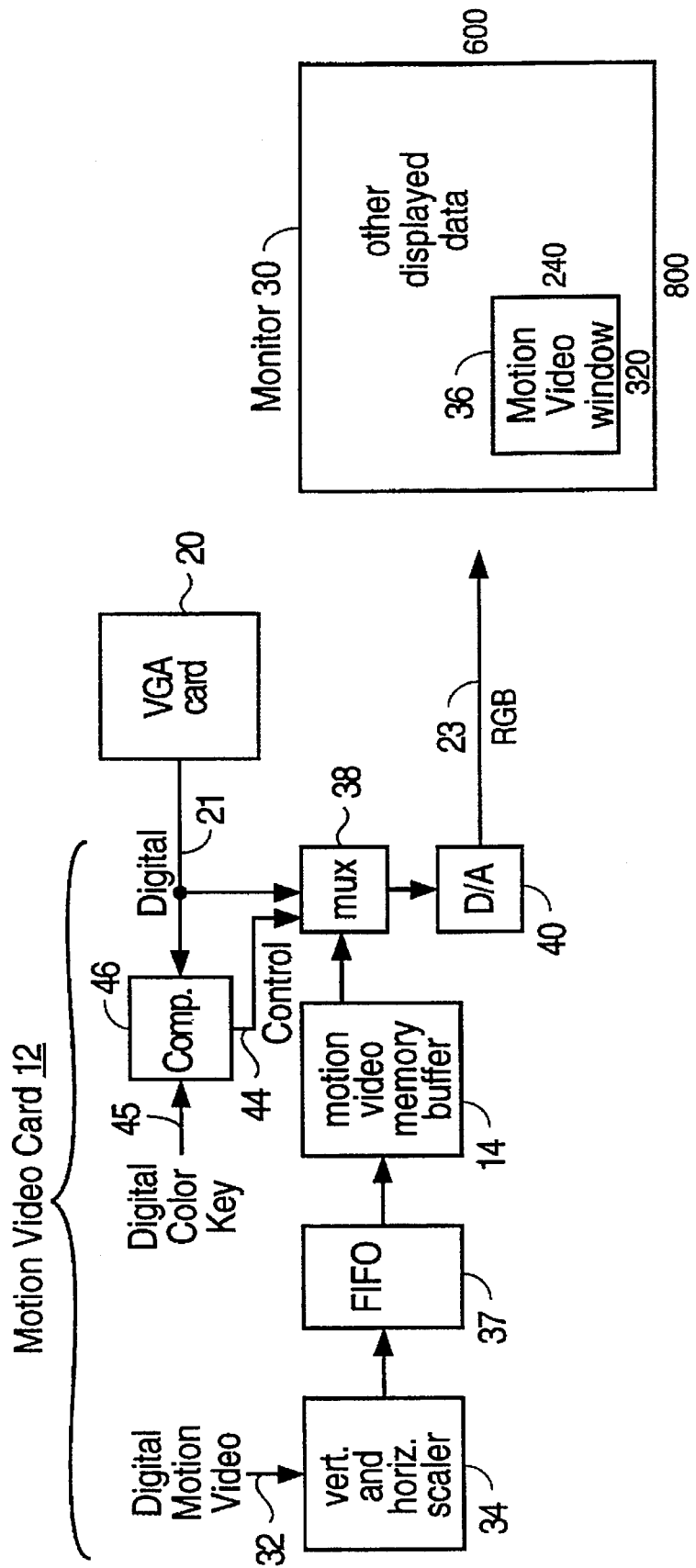
FIG. 2 is a block diagram illustrating in greater detail selected portions of the video card and the video overlay circuitry.

Thus, a multimedia system has been described which eliminates compatibility problems with VGA cards and video cards and greatly improves the quality of the displayed graphics and video data by not limiting the signal bandwidth to that provided by the feature connector 21 in FIGS. 1 and 2.

Ideally, the motion video data in video memory buffer 62 is outputted so that the desired motion video signals will be applied to monitor 58 at the precise time that the color key is being outputted by delay circuit 74; otherwise, the displayed motion video data will not be aligned within the allocated video window 56. Misalignment between the video data and the video window 56 will be perceptible to a viewer of the display screen. A cure for such misalignment will be described later. Other potential problems inherent in processing analog information, such as drift and synchronization problems, will also be discussed later along with a cure for these problems.

Figure 4:
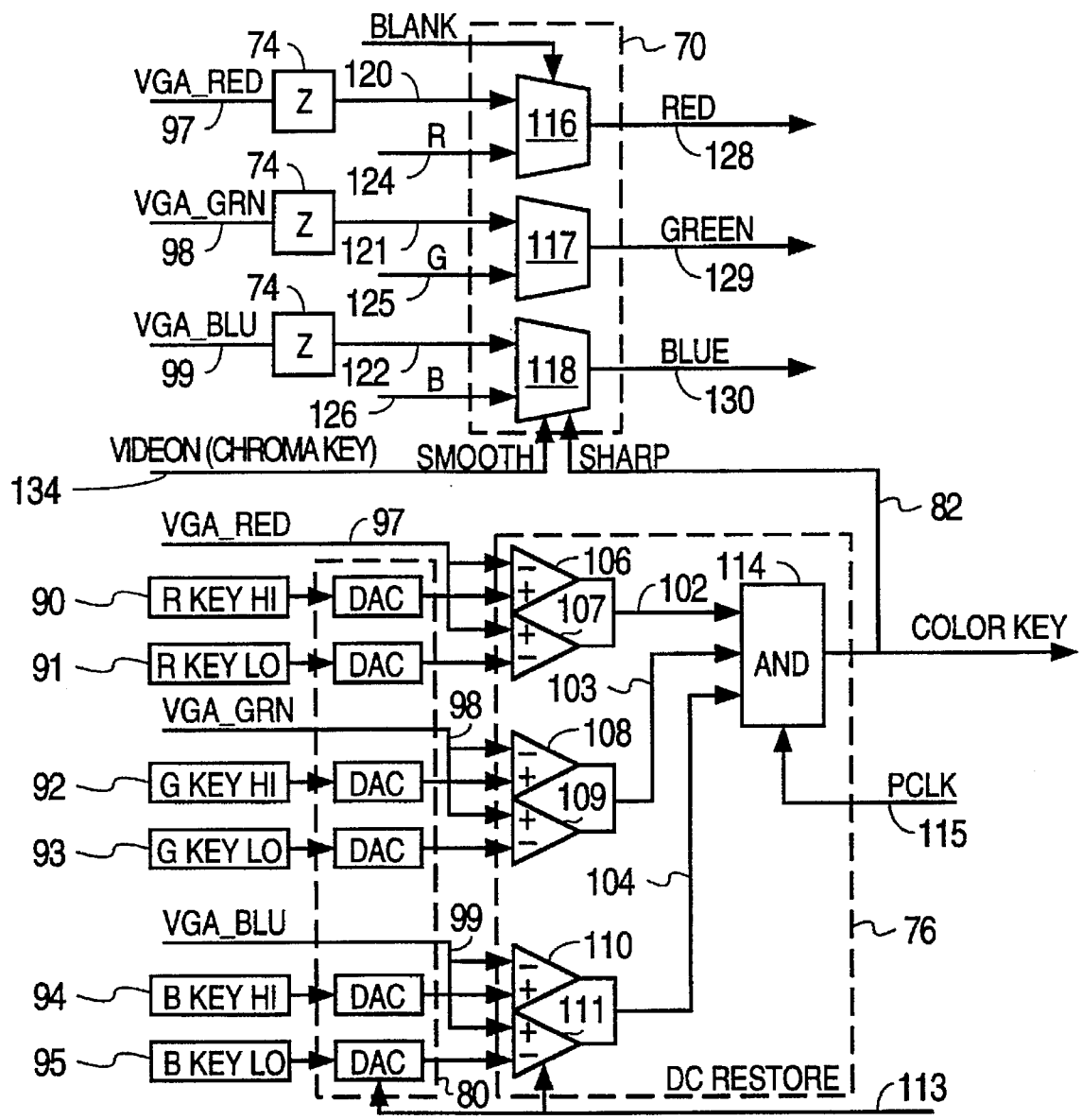
FIG. 4 is a block diagram illustrating the preferred embodiment analog multiplexer and the preferred embodiment analog comparator for use in the system of FIG. 3.

FIG. 4 illustrates a preferred embodiment of the D/A converter 80, analog comparator 76, and analog multiplexer 70 in FIG. 3. Although the user designates a particular color key (using, for example, the Windows™ program) which is digitally encoded in an RGB format, this color key in analog form may drift slightly from the intended digital color key value. In the particular embodiment shown in FIG. 4, a range of color key values are applied to an input of the D/A converters designated within D/A converter block 80. This range of color key values takes into account any possible drift in the analog output of the VGA card 54 due to temperature variations and other well known causes. Thus, referring to FIG. 4, the selection of a digital RGB color key value is automatically converted to maximum and minimum digital color key values which would be acceptable given anticipated variations in the analog signal on lines 72 in FIG. 3. Such maximum and minimum values may be automatically generated by adding or subtracting a certain value (e.g., ±3) from the originally selected color key value. These maximum and minimum RGB color key values are stored in registers 90–95 in FIG. 4, where the high and low color key values for the red analog signal are stored in registers 90 and 91, respectively; the high and low color key values for the green analog signal are stored in registers 92 and 93, respectively; and the high and low values of the blue analog signal are stored in registers 94 and 95, respectively.

The digital color key values stored in registers 90–95 are applied to the respective inputs of the D/A converters in D/A converter block 80 in FIG. 4, and the analog outputs of those D/A converters are applied to the inputs of the analog comparators 106–111 in analog comparator block 76. The comparators 106–111 compare the maximum and minimum analog RGB color key values with the red, green, and blue analog values on lines 97, 98, and 99, respectively, outputted by the VGA card 44 (lines 97, 98, and 99 are included in the RGB lines 72 in FIG. 3). If the analog signals on lines 97, 98, and 99 are all simultaneously within the ranges of the red, green, and blue color keys stored in registers 90–95, a high signal will simultaneously appear on lines 102, 103, and 104, connected to the outputs of comparators 106–111. AND gate 114 will then output a high signal on line 82, indicating that the analog RGB signal on lines 97–99 meets the color key criteria for switching the analog multiplexer 70 to pass the motion video data to the monitor 58. A pixel clock (PCLK) on line 115 is generated on the video card and clocks AND gate 114.

If desired to eliminate any adverse effects from reference level drift in D/A converters 80 and comparators 106–111, the D/A converters 80 and comparators 106–111 may perform a DC restore operation during each vertical blanking period pursuant to a DC restore signal on line 113. During this vertical blanking period (after a vertical sync pulse), the D/A converters 80 and comparators 106–111 will reset their own reference levels based on the known RGB blank signal levels on VGA output lines 97–99. This ensures that comparators 106–111 will accurately compare the RGB magnitudes of the VGA analog signal and the analog color key values. Such a resetting feature may be implemented in a variety of ways using conventional techniques.

FIG. 4 also shows the output of AND gate 114 being connected to a control input of analog multiplexer 70, shown within a dashed line. Multiplexer 70 consists of three multiplexers 116, 117 and 118 for switching the red, green, and blue analog output signals, respectively. To respective inputs of multiplexers 116–118 are applied the delayed VGA analog RGB graphics signals from delay circuit 74 on lines 120, 121, and 122. A second input to multiplexers 116–118 receives the delayed analog RGB video signals (outputted from delay circuit 68 in FIG. 3) on lines 124, 125, and 126.

The analog RGB outputs of multiplexers 116–118 are then applied to the input of amplifier 84 in FIG. 3 for subsequent application to the input of monitor 58. The analog multiplexers 116–118 and the amplifier 84 should be designed to not degrade the quality of the 135 MHz analog output of the VGA card 54 or the analog video data.

In a preferred embodiment, the switching of the analog multiplexer 70 between the video data and the graphics data is completed within one pixel clock period so that there will be no gap between the displayed VGA graphics data and the video data within the window 56. This sharp transition will be referred to as the sharp mode and is used for the color key overlay feature.

In the above-described embodiment, the color key value may be any value and not necessarily a value representing a particular color.

Also shown in FIG. 4 is an RGB video signal line 134 into the analog comparator 76 which is used for determining when the video data matches a preselected chroma key. When this matching of the chroma key and the video data occurs, the analog multiplexer 70 is controlled to then pass the VGA graphics data to amplifier 84. Detection of the video data may be performed by comparing an analog output of the D/A converter 66 (FIG. 3) to a selected chroma key using an analog comparator similar to the analog comparator 76 shown in FIG. 3. A range of chroma keys may be preselected in a manner similar to the selection of a range of color keys described with respect to FIG. 4. The circuits used to generate the chroma key signal on control line 82 may be virtually identical to the circuits used to generate the color key signal on line 82.

If it were desired to generate the chroma key signal using digital processing, the digital output of the video memory buffer 62 (or a FIFO buffer) would be simply compared to the preselected digital chroma key value to detect a match.

When using the chroma key overlay feature, it is not desirable to switch the analog multiplexer 70 within one pixel clock, since this would give rise to perceptible aliasing and Moiré effects on the display screen. Hence, when the chroma key is used, the analog multiplexer 70 should provide a smooth transition between the video data and the graphics data. This transition should be linearly smooth over two to thirty-two pixel clock cycles. During this period, the graphics data and video data are blended together and gradually switched. This also reduces false keying due to the video noise. This smooth control of the analog multiplexer 70 in the chroma key overlay mode may be implemented by placing a capacitor between the control line 82 and a reference voltage.

One skilled in the art may easily fabricate the various blocks shown in FIG. 4 using conventional circuit techniques.

FIG. 5A illustrates an improved D/A converter which may be used as the D/A converter 66 in FIG. 3. Conventional D/A converters are simply a collection of current elements, where each current element is assigned to one of the digital bits applied to the inputs of the D/A converter. The level of current provided by each current element is fixed and is related to the intended value of its associated digital bit. Each logical "1" digital bit applied to the D/A converter causes its associated current element to be connected to a common node. The sum of these currents produce an analog signal corresponding to the multi-bit digital value applied to the D/A converter. These current elements must be precise in order to produce accurate and reliable conversions. The most common D/A converters use a fixed current source assigned to each of the digital bits. The value of these current sources are not intended to be user-changeable.

In the prior art D/A converters used in personal computer multimedia applications, such as D/A converter 40 in FIG. 2, the digital bits applied to the D/A converter contain the digital information needed to control the red, green, and blue pixels on the monitor. In these conventional D/A converters, to increase the brightness level of the picture, the digital bits themselves are modified to increase their digital value so that a higher analog amplitude will be outputted from the D/A converter to increase the brightness level of the red, green and blue pixels. This requires additional computation by the processor which generates these digital values.

FIG. 5A illustrates an improved D/A converter for the red, green, and blue video pixel data streams. This converter obviates the need for any processor to perform additional computations when changing the brightness, contrast, or saturation level of the display. The D/A converter of FIG. 5A uses adjustable current sources whose current output levels are controlled using a separate D/A converter. The particular D/A converter shown in FIG. 5A processes six bits of red, green, and blue pixel data during each pixel clock cycle.

The incoming digital red, green, and blue pixel data are provided on lines 140, 141, and 142, respectively, from the motion video memory buffer 62 in FIG. 3 or a FIFO buffer connected to the output of memory buffer 62. These digital signals are clocked into the inputs of D/A converters 146, 147, and 148, associated with the red pixels, green pixels, and blue pixels, respectively. The pixel clock signal on line 150 may be generated on the video card using the vertical and horizontal synchronization signals outputted on lines 72 from the VGA card 54. The pixel clock controls switches 151, 152, and 153 to pass the red, green, and blue digital bits to the respective D/A converters 146–148.

The outputs of D/A converters 146–148 are analog RGB signals corresponding to the digital signals applied to their inputs. The magnitudes of these analog output signals are determined by the current source elements in each of the D/A converters 146–148, where these current source elements are represented by the variable current source 156. In contrast to the prior art D/A converters which provide fixed current sources for each D/A converter, the currents provided by the various current sources represented by current source 156 are adjustably set by the output of D/A converter 158. Digital signals provided by the level select circuit 160 correspond to the desired brightness level of the display. For a high brightness level, a corresponding digital signal is outputted from the level select circuit 160 and converted into a relatively high amplitude analog signal by D/A converter 158. This high output of converter 158 then causes the currents outputted by the current sources 156 to increase to thus cause the analog outputs of D/A converters 146–148 to increase by approximately the same proportion. Thus, using this device, when brightness is to be changed, only the reference level provided by current sources 156 is changed instead of changing the incoming pixel data on lines 140–142.

In the preferred embodiment, the level select circuit 160 contains a 6-bit register to provide 64 levels of brightness.

Timer 162, clocked by the vertical sync pulse on line 164, can be used to perform a video fading function, where timer 162 can be programmed to fade-in or fade-out from anywhere between 0 to 4 seconds. Timer 162 would raise or lower the digital value in the level select circuit 160 from an initial brightness value to 0 or from 0 to a final brightness value. Each application of a vertical sync pulse on line 164 clocks the timer 162.

In contrast to the function of timer 162, the conventional way of performing fading is to change the pixel bit values directly, which entails additional processor calculations. Typically, the pixel bit values are changed by doing simple bit shifting; however, this bit shifting causes the brightness to change exponentially. Timer 162 allows the brightness level to linearly change, which is much more appealing.

In the preferred embodiment, there is a separate and independent level select circuit 160, D/A converter 158, and adjustable current source 156 associated with each of the D/A converters 146–148. Thus, the red brightness, green brightness, and blue brightness may be performed independently. Therefore, this digitally controlled D/A converter of FIG. 5A can also be used to adjust the color balance between the red, green, and blue pixels. Timer 162 may be commonly connected to each of the level select circuits 160 to perform uniform fade-in for each of the pixel colors.

FIG. 5B is a schematic diagram illustrating a single one of the D/A converters 146, 147, or 148 and its associated adjustable current sources 156. As shown in FIG. 5B, each of the current sources 156 provides a relative current output which is dependent upon its bit assignment. Digital bits are applied to respective ones of switches 168, where the energized switches pass the current from their associated current source to a common output 170, representing the analog output of the inputted digital data. Each of the current sources 156 in FIG. 5B are variable in accordance with the output of the D/A converter 158 in FIG. 5A. For each 6-bit D/A converter 146–148, six variable current sources 156 and six switches 168 would be used.

FIG. 5C illustrates one of the many ways to adjust the output current of a current source. FIG. 5C illustrates only a single variable current source for simplicity; each of the current sources 156 in FIG. 5B would have a similar configuration. As shown in FIG. 5C, a fixed current source 163 provides a first fixed current $I_1$. A control signal on line 172 (generated by D/A converter 158) adjusts the analog resistance of a conventional variable resistor 174. Variable resistor 174 may be an active element, such as a transistor. The variable resistor 174 forms part of the adjustable current source and draws a portion $I_2$ of the current $I_1$ provided by the fixed current source 163. The current which now passes through switch 168 will be $I_3$. If each of the switches 168 in FIG. 5B are identical, then each may use an identical variable resistor 174 controlled by an identical control signal on line 172.

FIG. 5D illustrates another example of an adjustable current source which may be used in the circuit of FIG. 5A. Each of the adjustable current sources shown in FIG. 5B may be itself a D/A converter whose current output is dependent upon a digital signal applied to each of switching transistors 176 in FIG. 5D. Thus, the available current through each of transistors 168 would be dependent upon the digital value applied to switching transistors 176. Hence, the adjustable current source shown in FIG. 5D acts as both the D/A converter 158 and the variable current source 156 shown in FIG. 5A. For a 6-bit D/A converter 158, there would be six switching transistors 176 and six fixed current sources 177 associated with each transistor 168. The same 6-bit digital value outputted by level select circuit 160 may be applied to each of the six sets of transistors 176 in FIG. 5D.

An improved method and system for detecting an analog color key outputted by VGA card 54 in FIG. 3 will now be described. In conventional multi-media systems, a digital color key is preselected by the user (or automatically selected) and, when a matching digital color value outputted by the VGA card's feature connector is detected, the motion video data is then applied to the monitor instead of the graphics data. The video image is thereby displayed within a video window determined by the color key. However, when only the analog output of the VGA card is detected for the presence of the color key, such as with the system of FIG. 3, drifts in the analog signal may cause the intended color key to be difficult to detect. The analog comparator shown in FIG. 4 uses a range of color keys to take into account this possible drift in the analog color key so that if the analog color key falls within a selected range, the video data is applied to the display.

Figure 6:
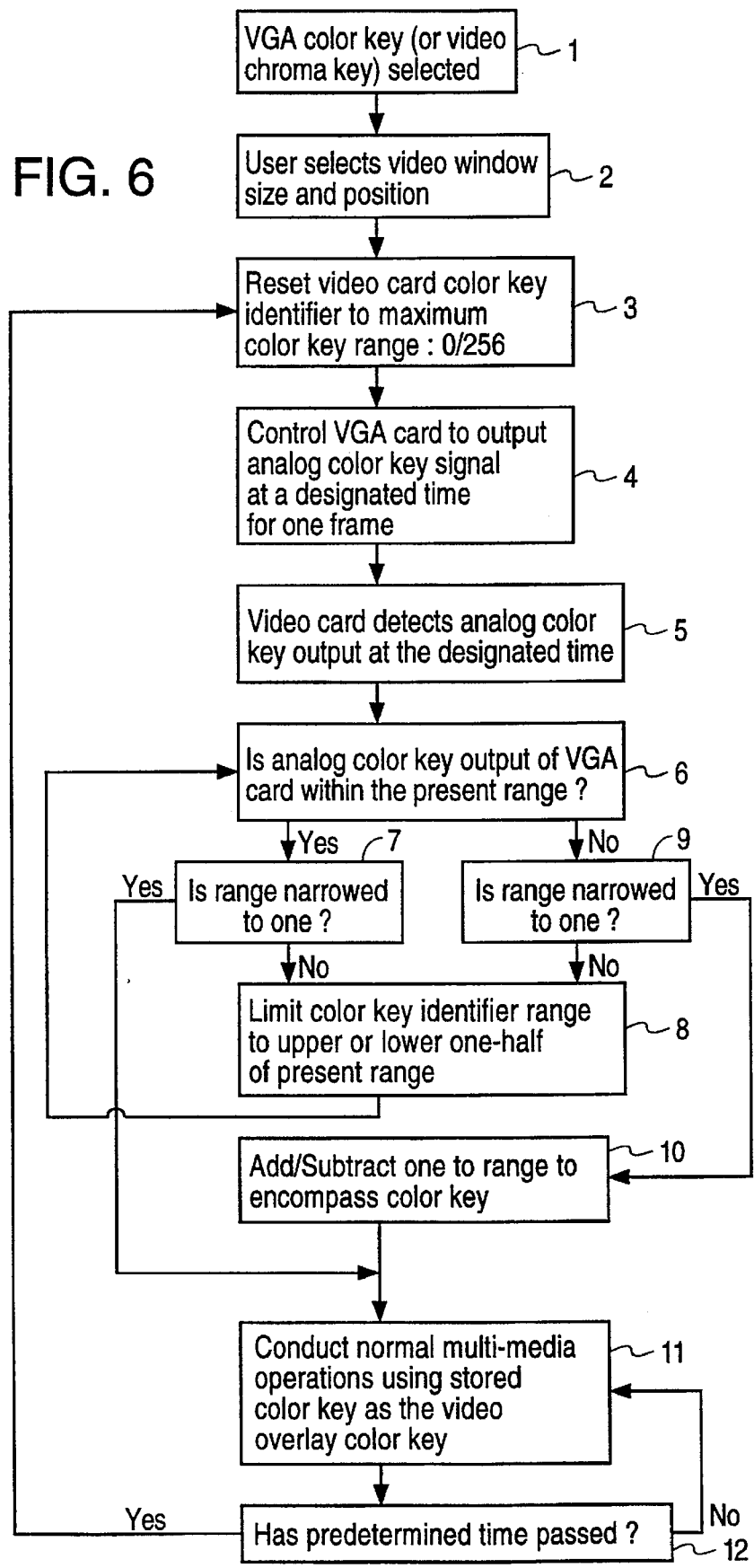
FIG. 6 is a flowchart illustrating the basic steps used to automatically identify a color key.

Another way to accurately detect the intended color key despite drifting of the color key signal is described with respect to FIG. 6. FIG. 6 is a flow diagram illustrating the basic steps used in this dynamic process. The various steps described in FIG. 6 may be easily implemented in software and by using conventional circuit techniques.

In step 1 of the illustrative process, the user selects a VGA color key using conventional techniques, such as offered by the Windows™ program. Although detection of a color key for overlaying a video window on a graphics display will be specifically described in this example, this process equally applies to detecting a chroma key outputted by the motion video card.

In step 2, the user selects the video window size and position using conventional techniques, such as by using the Windows™ program. This step may also be performed automatically by a multimedia applications program.

The following steps are now performed automatically under software control without user intervention.

In step 3, an upper color key value register and a lower color key value register in the video card are reset so that the upper color key value is the highest possible color key value (e.g., 256) and the lower color key value is the lowest possible color key value (e.g., 0). This step sets the maximum color key value range, in a digital form, within the color key identifier portion of the video card.

In step 4, the VGA card is then programmed and controlled to output an entire frame of the analog color key signal at a designated time. In another embodiment, this analog color key signal may also be outputted for a different time period and may not necessarily take up an entire frame. This color key will be displayed on the monitor for a short interval; however, this short interval will not be perceived by the user. To implement step 4, the analog color key signal may be inserted into the VGA frame buffer output or the VGA frame buffer may be itself loaded with the color key value.

In step 5, this outputted analog color key is applied to an input of the video card, and this analog color key signal is detected by the video card at the designated time. The personal computer may commonly control the VGA card and video card to perform this color key adjustment process, or a timer in the VGA card and video card may dictate when this color key adjustment process is to be performed.

In step 6, a determination is made whether the detected analog color key signal outputted by the VGA card is within the present color key identifier range set by the color key values within the upper and lower color key registers. The color key registers, D/A converters, and the comparators described with respect to FIG. 4 may be used for this process. If the detected analog color key signal is within the present range, a determination is made in step 7 whether the color key range has been narrowed to one. If not, the process continues to step 8 where the color key identifier range is limited to the upper one-half or lower one-half of the present range, depending on which half of the present range contains the color key. Similarly, if the detected color key is outside the present range, the process proceeds to step 9 where a determination is made as to whether the range has been limited to one. If not, the process continues to step 8.

After adjustment of the color key range, the adjusted color key values are then loaded into the upper color key value register or the lower color key value register, as appropriate, within the video card. Alternatively, this color key range limiting step may limit the color key identifier range to any subset of the previous range.

An iterative range-reducing loop then occurs between step 8 and 6 until the color key range is narrowed to one. If the range is narrowed to one and the VGA analog output matches the adjusted digital color key value, that digital color key value is retained as the final color key identifier value. If the range is one and the VGA output does not match the adjusted digital color key value, a color value of one is simply added to or subtracted from the color value (step 10) to cause that value to match the VGA output value. This digital color key value is then retained as the final color key. Alternatively, once the range has been narrowed to one, the range may be slightly broadened to encompass the analog output of the VGA card and allow for very slight drifts in the analog output which may occur prior to the next recalibration cycle.

In step 11, the normal operation of the multimedia system is then begun or resumed using the stored color key as the video overlay color key, as described with respect to FIGS. 3 and 4, where this color key would be applied to input 78 of the D/A converter 80 in FIG. 3.

The total time taken for the video card to perform steps 3-10 is less than 200 microseconds. This is much less than a single frame period of approximately 30 milliseconds.

In step 12, it is determined whether a predetermined time has passed for recalibrating the color key. If this time has passed, the process is looped back to step 3. If the predetermined time has not passed, the normal multi-media operation is continued. This predetermined time can be determined empirically based upon the rate of potential drift in the analog signals. This predetermined time period may range, for example, between 10 seconds to 1 hour.

The circuitry used to implement the process of FIG. 6 may utilize a simple programmed processor along with the circuitry shown in FIGS. 3 and 4. The automatic identification of an analog chroma key value may be performed by using a process virtually identical to that of FIG. 6, where the video memory buffer is controlled to output an analog chroma key, and a chroma key detection circuit narrows a chroma key range until it matches the analog chroma key output of the video memory buffer.

In conventional multimedia systems, there is frequently misalignment between the video window in the graphics display (determined by the VGA color key) and the video data to be displayed within the window. Such misalignment results in the intended boundaries of the video data not matching the boundaries of the video window. Such misalignment may even occur when the color key detection circuitry is operating perfectly. To correct this misalignment in conventional systems, the user must take steps to manually adjust (e.g., by using a mouse) the timing offset (e.g., zero point offset) of the video memory buffer so that the desired video data is outputted at the same time that the VGA frame buffer is outputting the color key. The zero point of the video memory buffer and the VGA frame buffer can be envisioned as the storage location in the buffer corresponding with the first pixel to be scanned on the display screen at the beginning of a frame. This misalignment between the video picture and the video window may be caused by a number of factors. For example, the size of the video memory buffer may be smaller than the frame buffer size, and the video buffer requires an initial zero point offset. Also, there may be unanticipated delay between the detection of a color key and the switching of the multiplexer which switches between the video data and the graphics data. Another cause of this problem stems from the fact that the graphics data and video data are clocked using different clocks and these clocks may drift apart. Due to any one of these various causes, manual intervention is needed to adjust the zero point timing of the video memory buffer to align the video data within the video window.

Figure 7:
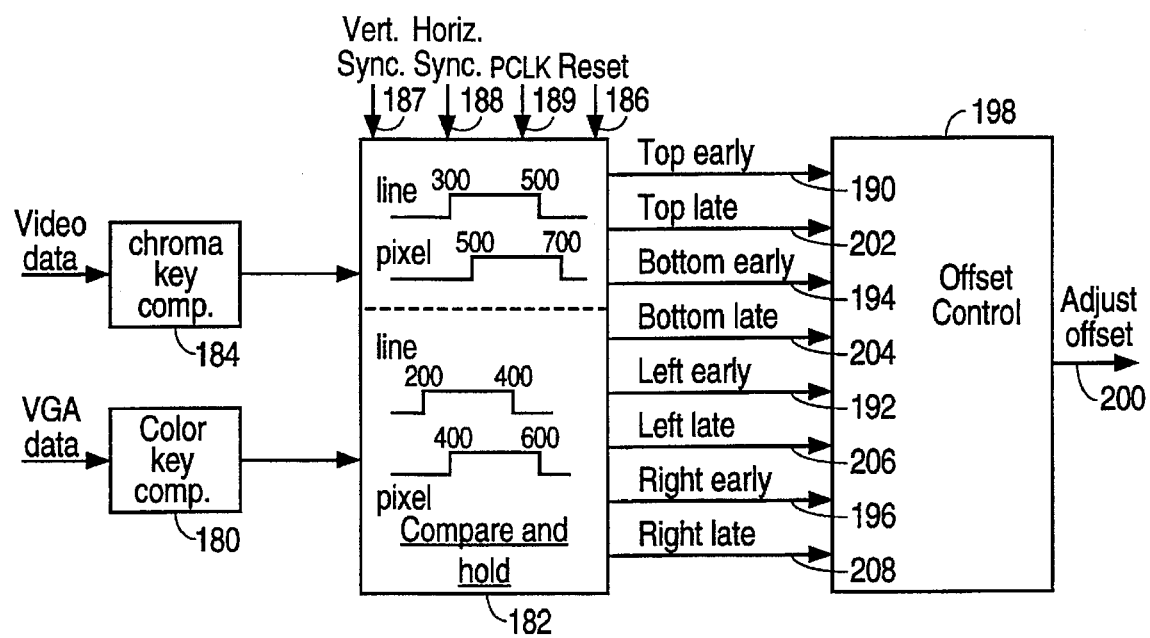
FIG. 7 is a block diagram illustrating one embodiment of a system for automatically aligning video data within a video window.

The circuit of FIG. 7 automatically detects this misalignment between the color key signal, outputted by the VGA card, and the video output. This circuit of FIG. 7 operates by automatically detecting the horizontal and vertical misalignment between the color key and the video output and then incrementally adjusting the video memory buffer's zero point offset until no misalignment is detected. The preferred embodiment of FIG. 7 will be described with respect to the flowchart of FIG. 8.

Figure 8:
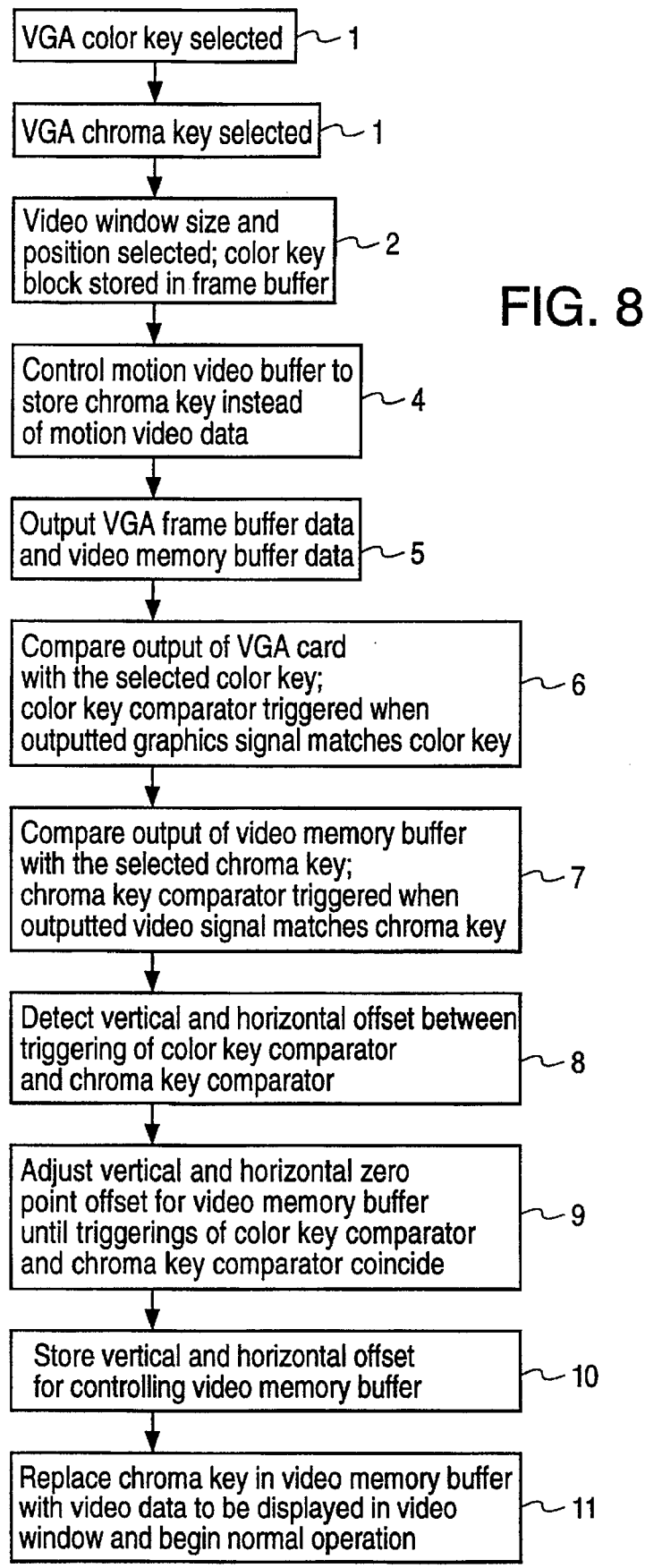
FIG. 8 is a flowchart illustrating the basic steps used to automatically align outputted video data with a video window.

In step 1 of FIG. 8, a VGA color key is selected either automatically or by the user as previously described. This color key is the signal used to signal the analog multiplexer 70 in FIG. 3 to switch between the video and graphics data.

In step 2, a chroma key is selected either automatically or by the user and, in this particular example, will be used for the express purpose of aligning the video window and the video data on the display screen.

In step 3, the user (or the application program) selects the desired video window size and position using conventional techniques. This automatically controls the VGA frame buffer to store the color key in the portion of the frame buffer corresponding to the video window.

In step 4, the video memory buffer is automatically controlled to store the chroma key in those storage locations of the video memory buffer where the video data is to be later stored for display in the video window.

In step 5, the data in the VGA frame buffer and video memory buffer are outputted.

In step 6, the output of the VGA card, which may be analog or digital, is compared to the selected color key using the color key comparator 180 in FIG. 7. A detection of the color key transmitted in the VGA data stream causes the output of the color key comparator 180 to go high. The compare and hold circuit 182 effectively identifies the starting position (line and pixel) of the color key (or video window) on the display screen. Such identification of the line and pixel location may be a count stored in a line counter and pixel counter. The graph within the block 182 shows that the VGA color key began at line 200 and at pixel position 400.

In step 7, conducted concurrently with step 6, the output of the video memory buffer is compared to the selected chroma key value by the chroma key comparator 184 in FIG. 7. The detection of the chroma key value in the video data stream causes the output of the chroma key comparator 184 to go high.

In the particular example illustrated within block 182, this detected chroma key value was detected at a time coincident with the scanning of line 300/pixel 500 of the display monitor. This value is held until the compare and hold circuit 182 is reset by a reset signal applied to input 186.

The vertical synchronization pulse, horizontal synchronization pulse, and pixel clock are applied to inputs 187, 188, and 189, respectively, to enable the circuit 182 to detect the relative positions of the color key and chroma key with respect to the display screen.

In step 8, the compare and hold circuit 182 now compares the chroma key position to the color key position in both the vertical (line) and horizontal (pixel) directions and generates a vertical and horizontal offset value.

In one embodiment, this offset is generated as follows. In the example of FIG. 7, the color key was detected at line 200 and the chroma key was detected at line 300. Thus, the top of the video window (color key) was detected as occurring earlier than the top of the chroma key (which will eventually be replaced by the video data). This causes a top early bit on terminal 190 to be set as a 1 bit.

In the horizontal direction, the color key was detected at pixel 400 while the chroma key was detected at pixel 500. Thus, the left portion of the video window occurred earlier than the left portion of the chroma key, and a left early bit on terminal 192 will be set to a 1 bit.

In the preferred embodiment, the sizes of the color key block and chroma key block may also be adjusted to make these sizes equal for a precise overlap of the video data and video window. In the particular example of FIG. 7, the color key terminated at line 400 and pixel 600, which are both prior to the termination of the chroma key block on line 500 and pixel 700. Thus, a bottom early bit on terminal 194 and a right early bit on terminal 196 will be set to 1.

The output bits on the terminals of block 182 are detected by the offset control circuit 198 as indicating that the video memory buffer timing must be advanced in both the vertical and horizontal directions to align the chroma key block with the video window.

This offset adjustment signal is outputted at terminals 200 for providing an appropriate offset to the video memory buffer timing, such as provided by video clock 64 in FIG. 3.

Such an offset may be implemented in a number of ways. In a preferred embodiment, the detection of the top early bit causes the line clock for the video memory buffer to be offset (advanced) by one-half the vertical size of the video memory buffer, such as 240 lines, or offset by some initial increment. The detection of the left early bit will, in the preferred embodiment, provide an offset of one-half the length of a horizontal pixel line in the video memory buffer (or some other incremental amount) so that, as a result, the chroma key block within the video data stream will be clocked out from the video memory buffer much earlier.

During the next cycle, the compare and hold circuit 182 will output a 1 bit on the top late terminal 202, the bottom late terminal 204, the left late terminal 206, and the right late terminal 208 in the particular example above. An output of the offset control circuit 198 will then offset (delay) the video memory buffer line count and pixel count one-quarter of the vertical and horizontal video memory buffer size until the bit values have once again been reversed. This incremental offset is repeated using smaller and smaller offsets in both a positive and negative direction as needed to cause all the outputs of the compare and hold circuit 182 to be all zero bits (step 9). At this time, the proper zero point offsets have been set for the video memory buffer timing.

In an alternate way to accomplish step 9, the vertical positions of the detected chroma key and color key are compared by counting the horizontal sync pulses applied to input 188 to provide a vertical offset to the clocking of the video memory buffer of, for example, 100 lines, to align the top of the chroma key output with the video window. Similarly, the pixel clock applied to input 189 may be used to identify the precise horizontal pixel offset between the chroma key output and the video window to provide a pixel offset to the clocking of the video memory buffer.

If the actual size of the chroma key block does not match the size of the video window, the top early (or late) bit will not trigger along with the bottom early (or late) bit, or the left early (or late) bit will not trigger along with the right early (or late) bit. The horizontal and/or vertical size of the chroma key block stored in the video memory buffer must then be either enlarged or reduced, as necessary, to precisely match the size of the stored chroma key with the video window. This may be performed by controlling any vertical and horizontal scaler, such as scaler 52 in FIG. 3, to change the size of the stored chroma key block as necessary so that the top and bottom bits trigger together and the left and right bits trigger together. This size adjustment may be performed by incrementally adjusting scaler 52 (or any zoom circuit) until the sizes are matched.

The final offsets are then stored in step 10 and used to provide any offset delay for the timing of the video memory buffer.

In step 11, the chroma key values in the video memory buffer are now replaced by the actual video data to be displayed in the video window, and normal operation is resumed.

The entire software-controlled process from steps 4 to 11 occur within a period of approximately 100 microseconds. The human eye typically does not detect any flicker less than 200 milliseconds.

Figure 9A:
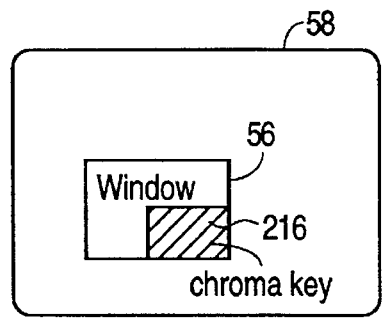
FIGS. 9A and 9B illustrate the misalignment and alignment, respectively, of the video data and video window on a display screen.
Figure 9B:
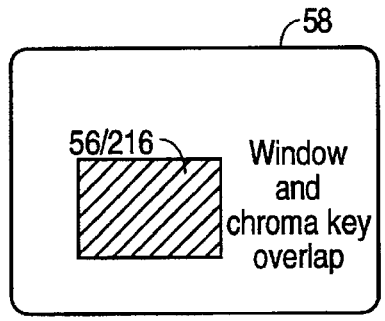

FIG. 9A illustrates the initial condition prior to this automatic alignment process where the monitor 58 displays the video window 56, as determined by the color key, and the misaligned chroma key data 216 transmitted in the video data stream. FIG. 9B illustrates the display screen of monitor 58 after alignment using the process of FIG. 8 where the video window 56 and the chroma key data 216 precisely overlap.

Figure 10:
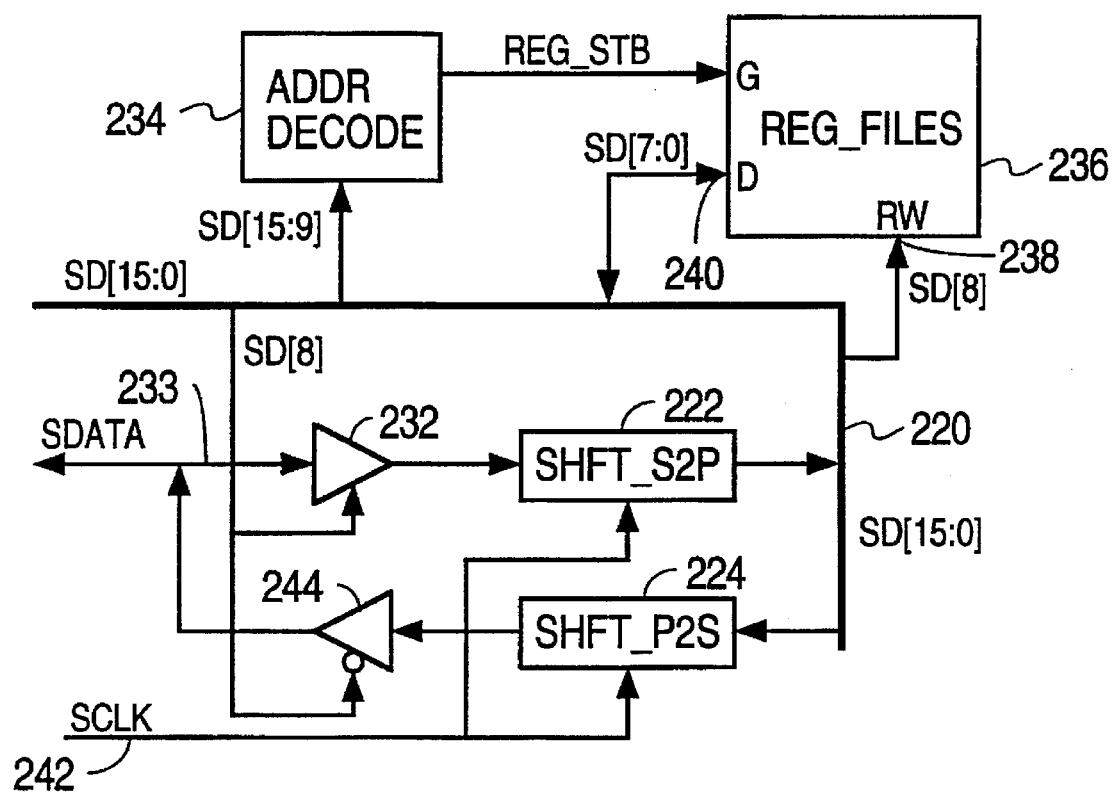
FIGS. 10, 11A and 11B illustrate a novel data transfer system and format for interfacing a personal computer with a motion video card.
Figure 11A:
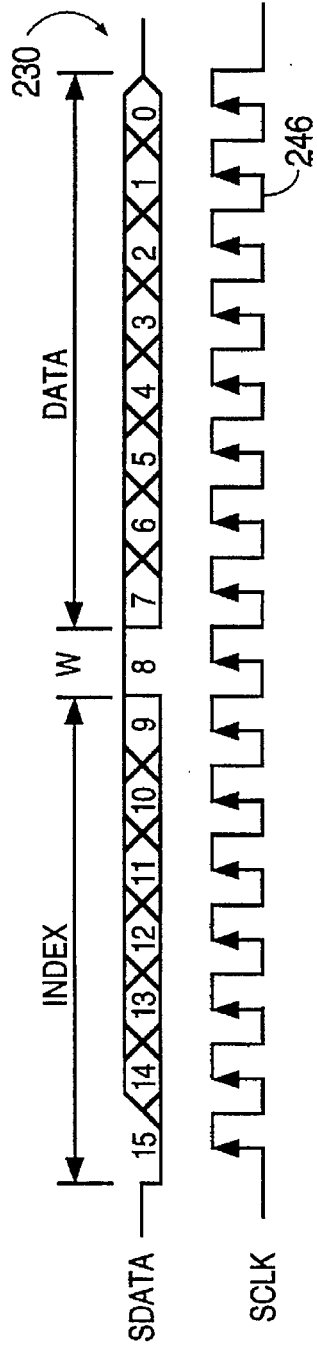
Figure 11B:
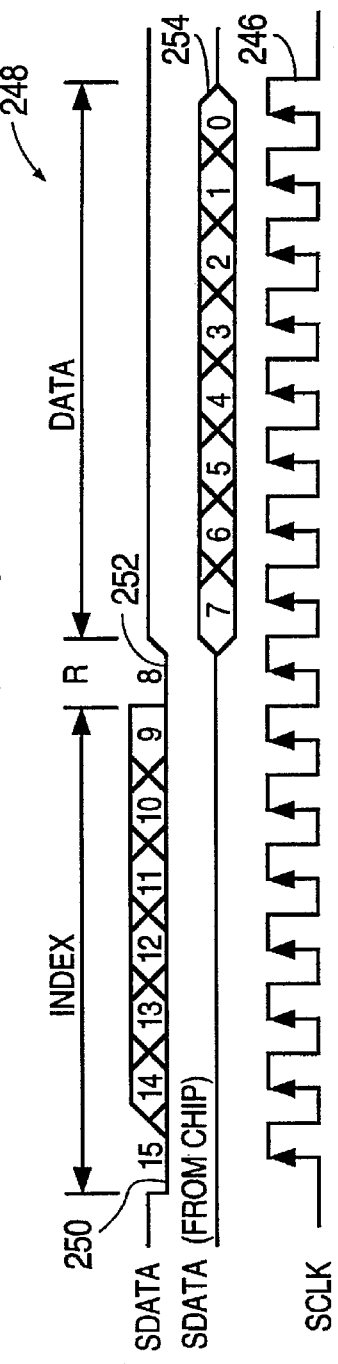

FIGS. 10, 11A and 11b illustrate a personal computer interface structure and data format for transmitting and receiving packets of data to and from a video card. In conventional methods, a first packet is transmitted containing an address or index, and the sending circuit (or a controller) then waits for acknowledgement before sending the data to the addressed circuit. A second packet is then sent containing the data. These prior art packets could be any length since they used start and stop bits.

FIGS. 10, 11A and 11B illustrate a new structure and method whereby a single packet containing a predetermined number of index bits followed by a predetermined number of data bits is transmitted and received as a single packet. The circuit of FIG. 10 is located in the motion video memory card and acts as an interface between the host personal computer (PC) and the various circuits on the motion video card. Instructions from the PC are used to program the motion video card to, for example, generate a video block of a specified size to be transmitted upon the detection of a specified color key. These instructions may also control the video card to implement any of the processes described herein. Data transmitted from the video card to the PC may include, for example, data which is to be stored on a hard disk.

The circuit of FIG. 10 includes a 16 bit parallel bus 220, a serial-to-parallel converter 222, and a parallel-to-serial converter 224 connected to the parallel bus 220. Serial address/data bits from the host are provided in a 16 bit packet as shown in FIG. 11A as packet 230. The packet consists of a first seven serial bits of index information, followed by a read/write bit, followed by eight data bits. This serial address/data is supplied from the host to the input of tristate buffer 232 in FIG. 10. This serial data stream is converted to 16 parallel bits by converter 222 and placed on bus 220. Tristate buffer 232 remains enabled by the write control bit (bit 8 in packet 230) on bus 220. The first seven bits of the packet are decoded by the address decoder 234, which then addresses a particular register or other circuitry within register file 236. The read/write bit is applied to an R/W input terminal 238 of the register file 236 for identifying that the eight bits of data applied to data port 240 are to be written into the addressed register.

The clocking of the serial data is obtained from a serial clock source connected to serial clock line 242.

When the host desires to read data from a register in register file 236, the host transmits a 7-bit serial address and a read bit (bit 8) in packet 248, shown in FIG. 11B. The address is then converted to a parallel 7-bit signal and applied to the address decoder 234, and the read bit is applied to the R/W terminal 238. The tristate buffer 244 is enabled by this read bit. The addressed register in register file 236 then places its eight bits of data on parallel bus 220, and this parallel data is converted to a serial 8-bit packet by the parallel-to-serial converter 224. The serial data is then transmitted by tristate buffer 244 through the serial data line 233 to the host.

FIG. 11A illustrates the write timing diagram 230 showing the serial clock 246. FIG. 11b illustrates the read timing diagram 248 where the host provides a 7-bit address 250 followed by a read bit 252, and the addressed register provides the requested eight bits of data 254 to the host.

Figure 12:
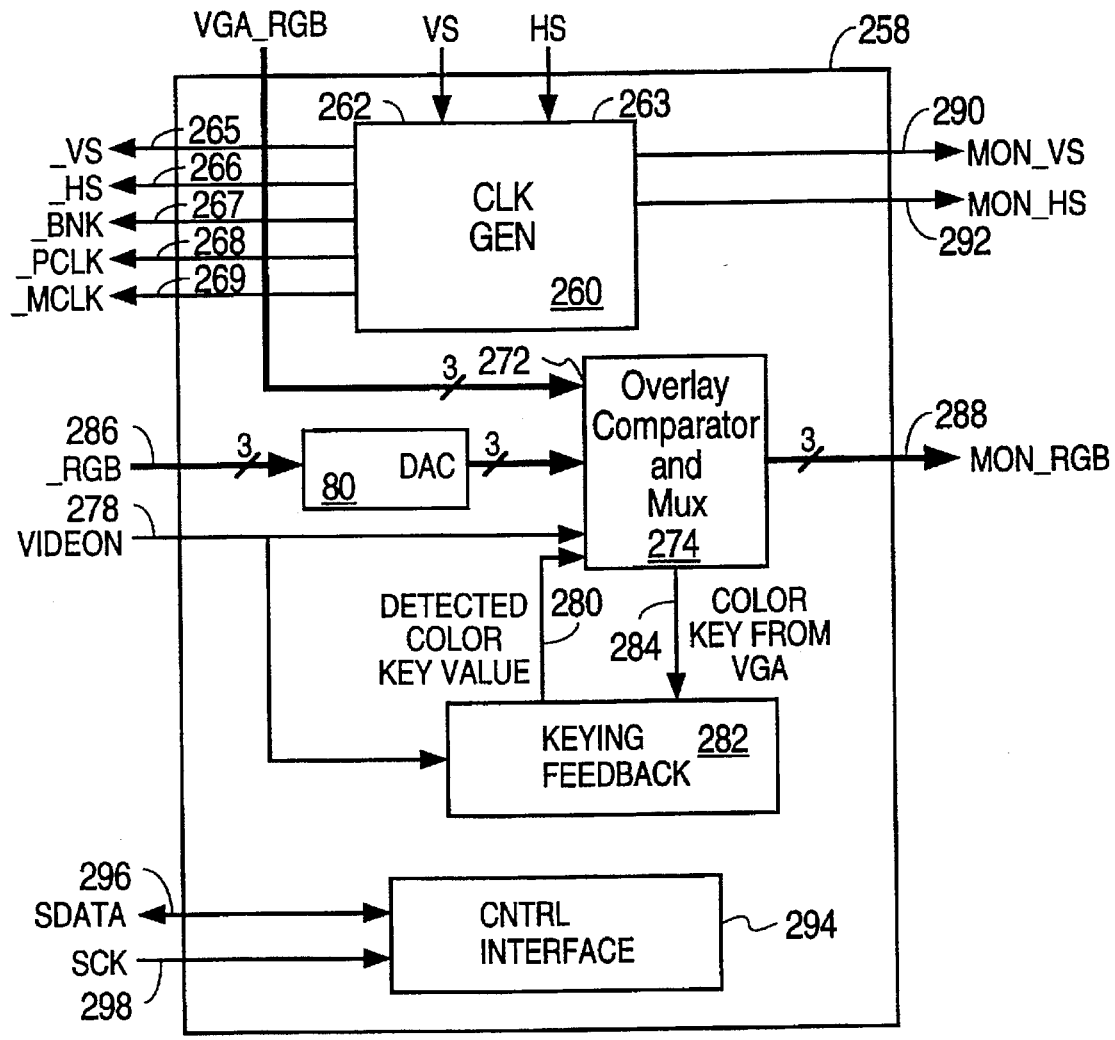
FIG. 12 is a functional block diagram of a monolithic video controller chip which controls a video memory buffer and which performs the automatic detection and alignment functions described herein.

FIG. 12 is a block diagram of the basic functional blocks in a preferred embodiment monolithic chip 258 for mounting on a motion video card.

Chip 258 includes a clock generating circuit 260, which receives at ports 262 and 263 the vertical sync and horizontal sync pulses outputted on analog terminals 72 of the VGA card 54 in FIG. 3. Clock circuit 260 outputs vertical sync pulses, horizontal sync pulses, blanking pulses, pixel clock, and memory control clock on terminals 265–269, respectively, for operating the video memory buffer and other circuitry internal and external to chip 258.

The analog RGB output of the VGA card 54 is applied to port 272 of the video overlay circuit 274. The video overlay circuit 274 also receives the output from D/A converter 80, the chroma key signal (video) 278 from the video memory buffer, and the detected color key value on line 280 outputted by keying feedback circuit 282. This detected color key value was extracted from the VGA analog output by performing the method of FIG. 6. The VGA color key output during the color key detection process is outputted on line 284 to the keying feedback circuit 282. The keying feedback circuit 282 also contains the alignment circuitry of FIG. 7 for offsetting the video timing signals outputted by clock generating circuit 260. The D/A converter 80 receives the RGB video data stream on line 286.

The video overlay circuit 274 provides the comparator, delay, and multiplexing functions described with respect to FIG. 3, where either a color key or a chroma key is used to switch between an incoming video data stream or graphics data stream. The analog RGB output 288 of the overlay circuit 274 is transmitted to a conventional VGA monitor, along with the vertical and horizontal sync pulses outputted on line 290 and 292 by clock generating circuit 260.

A control interface circuit 294 (shown in detail in FIG. 10) interfaces the chip 258 with the host personal computer and transmits/receives serial data via port 296. A serial clock is applied to port 298. Internal connections between the various blocks have been omitted for simplicity.

One skilled in the art would understand the construction of the various circuits described herein as well as the software used to control the various circuits.

While particular embodiments of the present invention have been show and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method for automatically identifying a key signal value in a multimedia application, said method comprising the steps of:

selecting a digital key value;

controlling a first memory buffer to output a digital key signal determined by the digital key value at a designated time and for a designated period;

converting digital outputs of said first memory buffer to a first analog signal;

detecting said first analog signal during said designated period to obtain a detected analog color key value, said detected analog color key value for use in controlling a multiplexer for passing either graphics signals or motion video signals to a display device;

converting said detected analog color key value into a digital representation of said detected analog color key value;

storing said digital representation of said detected analog color key value to obtain a stored key value;

controlling said first memory buffer to output second digital signals after said designated period, said second digital signals for controlling pixels in said display device;

comparing a signal corresponding to said stored key value with analog signals corresponding to said second digital signals outputted after said designated period; and controlling a multiplexer to pass either graphics signals or motion video signals to said display device, depending upon an outcome of said comparing.

2. The method of claim 1 wherein said first memory buffer is a graphics buffer and said digital key signal is a color key.

3. The method of claim 1 wherein said first memory is a motion video buffer and said digital key signal is a chroma key.

4. The method of claim 1 wherein said first analog signal outputted during said designated period is detected by incrementally reducing a possible range of color key values within which said first analog signal falls until such range is narrowed to a desired range, and then storing said range to obtain said stored key value.

5. The method of claim 1 wherein all of the recited steps are repeated periodically to recalibrate an analog key detection circuit.

6. The method of claim 1 where said designated period is one frame period.

* * * * *